Feb. 17, 1959     L. L. HEIKKINEN     2,873,614
VEHICLE MOUNTED WINCH
Filed Oct. 23, 1956
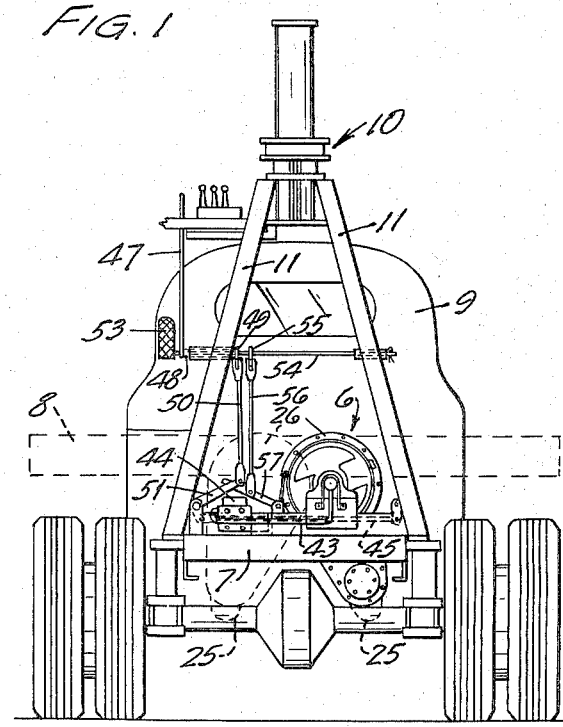
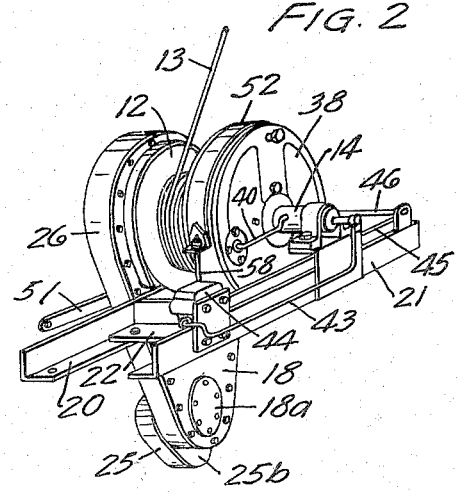
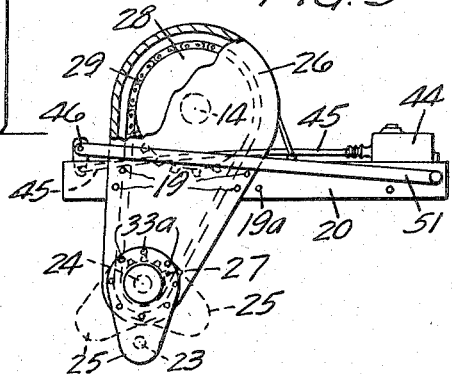
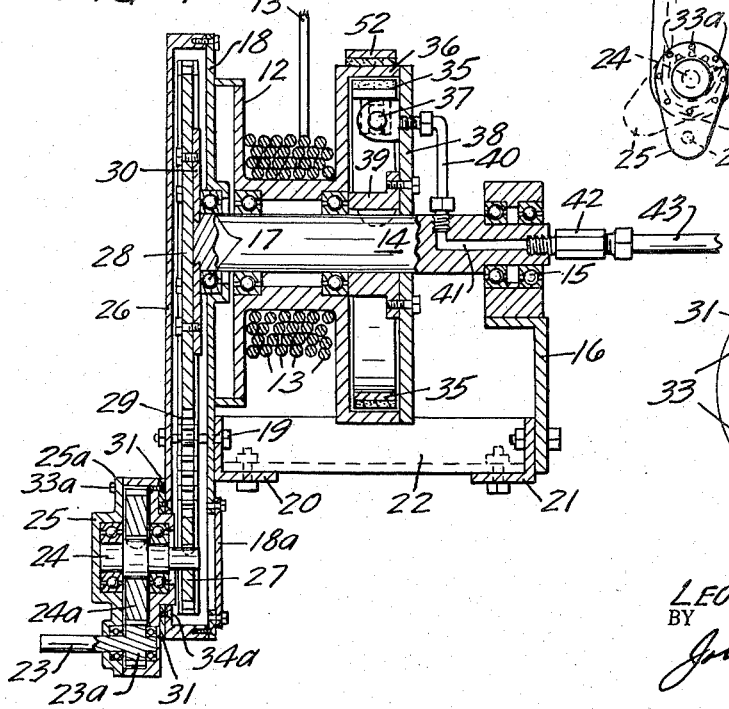
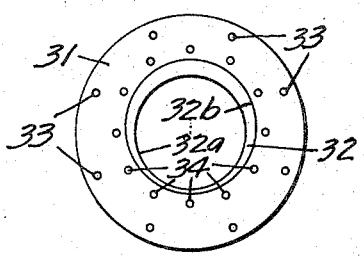
INVENTOR.
LEO L. HEIKKINEN
BY
John E. Thyler
ATTORNEY

United States Patent Office 2,873,614
Patented Feb. 17, 1959

2,873,614

VEHICLE MOUNTED WINCH

Leo L. Heikkinen, Prentice, Wis.

Application October 23, 1956, Serial No. 617,857

5 Claims. (Cl. 74—380)

This invention relates to winches and particularly to improved driving mechanism therefor adapted to be connected to power take-off shafts variously located on trucks and other power-driven traction vehicles.

Heretofore winches for use on trucks and like vehicles have either been provided with separate motors for driving the winches or the latter have been specially designed to be driven from a power take-off of a particular truck or the driving connections between the power take-off shaft and the winch have been specially constructed, usually at relatively large expense. Some truck manufacturers, for example, locate the power take-off shaft at the left side of the transmission case and others at the right side. Usually the take-off shaft extends to the rear of the transmission case at an elevation below the vehicle platform or floor for supporting the load. There are also variations in the spacing of the take-off shafts below the platform and variations in the spacing of these shafts laterally from the vertical center plane through the engine of modern trucks of different capacities and makes.

It is an object of my invention to provide a winch and driving mechanism therefor which is readily adjustable for connection with power take-off shafts variously located with respect to the axis of the winch drum, both as to elevation and laterally.

A further object is to provide a winch of the class described which is unusually compact, occupying a minimum of space on the vehicle and leaving a maximum floor area for carrying pay loads.

A particular object is to adapt a winch for use with trucks and other vehicles having power take-offs in widely varying locations by providing winch drum driving mechanism having a plurality of interconnected transmission units adapted to be extended at various angles downward and at either side of the axis of the drum and also adapted to make connection with power take-off shafts located at different elevations relative to the axis of the winch drum mounted on the vehicle.

My invention also includes certain other novel features of construction which will be more fully pointed out in the following specification and claims.

Referring to the accompanying drawing which illustrates, by way of example and not for the purpose of limitation, a preferred embodiment of my invention:

Figure 1 is a rear elevation view showing my improved winch and driving mechanism mounted on a truck chassis of common type;

Fig. 2 is a perspective view showing the invention separate from the vehicle;

Fig. 3 is a front elevational view of the winch unit,

Fig. 4 is a sectional view taken in a plane through the axes of the drum, power drive shaft, intermediate shaft and transmission gearing, and Fig. 5 is a rear elevational view of the adapter plate for connecting one of the gear housings to the other gear housing at various angles about the axis of the intermediate shaft.

As shown in Fig. 1, my improved winch indicated generally by the numeral 6 may be mounted on a truck chassis having main horizontally extending frame members 7 upon which may be mounted a load supporting platform indicated in broken lines at 8. The cab of the truck, usually located at the front end of the main frame 7, is indicated at 9. For most installations my improved winch 6 is mounted on the frame members 7 at the front end of the platform 8 between this platform and the cab 9. The winch may be used with a hoist indicated generally at 10 having supporting leg members 11 which straddle the winch and are rigidly connected to the truck frame.

As best shown in Figs. 2 and 4, the winch has a drum 12 upon which a cable or rope 13 may be wound and from which the cable may be unwound under control of clutch and brake mechanism hereinafter described. A drum shaft 14 revolubly supports the drum 12 and this shaft is journaled at one end in bearings 15 supported on a bracket 16 and at the other end in bearings 17 carried by a housing plate 18. This plate is adjustably connected by bolts 19 to a base member 20 which is supported on the main frame members 7 of the vehicle. A second base member 21 extends in spaced parallel relation to the member 20 and is rigidly connected thereto by cross members 22. Base members 20 and 21 extend crosswise of the vehicle frame and may be secured thereto in suitable manner in selected positions as required to make the driving connections with the power take-off shafts variously located.

A power shaft 23 and an intermediate shaft 24 are mounted in suitable bearings in a housing 25 and these shafts are operatively connected together by a pinion 23a fixed on the shaft 23 and a gear 24a fixed on the shaft 24 and meshing with the pinion 23a. Shaft 23 projects from housing 25 at one side and is adapted to be coupled in suitable manner, end to end, with the power take-off shaft of a truck or other vehicles upon which the winch is to be mounted. These power take-off shafts are ordinarily located at the rear side of the transmission case or gear box of the vehicle. At its rear side housing 25 has a closure plate 25a which is formed with a hub portion projecting into an opening in a second housing 26.

An end of the shaft 24 projects from the rear side of housing 25 into the second housing 26 and the latter contains a sprocket pinion 27, a sprocket wheel 28 and a chain 29 operatively connecting the pinion 27 to the wheel 28. The end of the shaft 24 within the housing 26 is keyed to the pinion 27 so that the latter drives the sprocket wheel 28 by means of the chain 29. Sprocket wheel 28 is secured to an annular flange 30 fixed on an end of the drum shaft 14 to drive the latter shaft by power transmitted from the shaft 23 through pinion 23a, gear 24a, shaft 24, pinion 27, chain 29 and wheel 28.

Interposed between the housings 25 and 26 is an adapter plate 31 formed to be connected to both of these housings. As best shown in Fig. 5, adapter plate 31 has a bearing member 32 formed with an inner cylindrical surface 32a adapted to fit the exterior surface of the hub portion of plate 25a. An outer circular series of holes 33 concentric with the surface 32a are formed in the plate 31 to receive bolts 33a for securing this plate to the housing 25. There is also an inner circular series of tapped holes 34 in the plate 31 eccentric to the surface 32a to receive machine screws 34a or the like for securing the adapter plate to the housing 26 in selected angular positions relative to the housing 26.

An outer periphery 32b of the bearing member 32 is concentric with the circle defined by the centers of the holes 34 and is eccentric to the circle of holes 33. Another circle of holes is formed in the housing 26 to register with the holes 34 but there are a larger number of the latter than there are of the holes in the housing 26 to receive the bolts 34a. Thus the screws 34a and adapter plate 31 may be used to connect the housing 25 to the housing 26 at various angular positions as indicated in broken lines in Fig. 3. By securing adapter plate 31 in selected angular positions relative to the housing 25 the shaft 24 may be moved by operation of the eccentric surface 32a fitting the hub of the housing 25 to provide a chain tightening adjustment for the chain 29 in housing 26. Supporting plate 18 of the housing 26 is formed with an opening in its lower portion to allow access to the pinion 27 and screws 34a for fastening the housing 26 to the adapter plate 31.

Angular adjustment of the housing 26 about the axis of the drum shaft 14 is obtained by securing the housing 26 to the base frame member 20 in various angular positions. To this end the member 20 may be drilled to provide additional holes 19a (Fig. 3) in which the bolts 19 may be placed. By such means housing 26 may be secured, for example, in the broken line position indicated in Fig. 1.

Clutch mechanism of conventional type may be provided for operatively connecting the drum 12 to the shaft 14. As shown, this mechanism comprises clutch shoes 35 rotating with the shaft 14 and adapted to engage the inner surface of a cylindrical flange 36 projecting from the periphery of the drum 12 at one side, and mechanism for expanding the shoes 35 to frictionally engage the flange 36. Operating mechanism for the clutch shoes 35 may comprise a hydraulic cylinder 37 operatively connected to the shoes and mounted on an annular plate 38 having a hub portion 39 keyed to the shaft 14 and means for supplying the hydraulic cylinder 37 with fluid under pressure. Connections for supplying fluid under pressure to the cylinder 37 may include a fluid line 40 communicating with the cylinder 37 at one end and with a passage 41 formed in the shaft 14 at the other end. The passage 41 may be supplied with pressure fluid through a swivel fitting 42 coaxially mounted on an end of the shaft 14 and supplied through a line 43 extending to a fluid pump 44 (Figs. 1 and 2). A pump actuating rod 45 is movable longitudinally by a cam fixed on a rock shaft 46 and the latter is operatively connected by suitable linkage to a clutch lever 47 which is accessible for manual operation from either a position of an operator on the platform 8 or seated on the top of the cab 9. The linkage may comprise a horizontally extending shaft 48 having a bearing support in one of the legs 11, a lever 49 fixed on the shaft 48, a link 50 extending downward from the free end of the lever 49 and a lever 51 having one end connected to the link 50 and the other end fixed on the shaft 46. The operator, by actuating the lever 47 in a suitable direction, forces fluid under pressure from the pump 44 into the clutch cylinder 37 to expand the brake shoes 35 and operatively connect the drum 12 to drum shaft 14. Reverse movement of the lever 47 causes the clutch shoes to release the drum 12.

Brake mechanism for holding the drum 12 against rotation is also provided. This mechanism may also be of conventional construction and may comprise a brake band 52 connected by suitable linkage to a lever 53 (Fig. 1). This lever is arranged to turn a shaft 54 connected by a crank arm 55 to a link 56 adapted to actuate an arm 57 having a pivotal support on the base of the winch and a crank extending from the pivotal support to a rod 58 for actuating the brake band 52.

When the winch is to be operatively connected to the power take-off shaft of a truck or like vehicle, the base comprising the members 20 and 21 is placed loosely on the truck frame members 7 in the approximate position required. The bolts 19 may be removed to permit angular movement of the housing 26 about the axis of the drum shaft 14 and access plate 18a is removed from the plate 18. The screws 34a connecting the housing 26 to the adapter plate 31 are also removed, leaving the housing 25 free to turn approximately about the axis of the shaft 24 relative to the housing 26. Shaft 23 is now aligned with the power takeoff shaft of the vehicle and is coupled thereto, end to end, by a flexible coupling of common type, preferably by the use of a long slip type joint on the shaft 23. During this operation the angular position of the adapter plate 31 on the housing 25 may be changed to obtain the desired tension in the chain 29. Selected holes 34 in the adapter plate 31 are now aligned with the holes in the housing 26 for the screws 34a and these screws are used to fasten housing 26 to the adapter plate at the selected angle. This is followed by the closing and securing of the access plate 18a over the opening in the plate 18. Bolts 19 are now used to connect the housing 26 to the frame member 20 at a selected angle and position on the frame members 7 and base members 20 and 21 are secured in the adjusted position on the vehicle members 7. Finally the linkage between the clutch lever 47 and the pump actuating lever 51 and that between the brake lever 53 and lever 57 are assembled to afford controls for operating the drum 12 from the shaft 14 and for holding the drum against rotation as required.

It will thus be evident that the shaft 23 carrying the pinion 23a driving the gear 24a and shaft 24 in the housing 25 constitutes one transmission unit and that sprocket pinion 27, chain 29 and wheel 28 in the housing 26 constitute a second independently adjustable transmission unit. These units in combination with means for securing them in selected angular positions greatly facilitate the alignment of the shaft 23 with the power take-off shafts variously located on vehicles.

I claim:

1. In driving mechanism for operatively connecting the drum shaft of a vehicle mounted winch to power take-off shafts variously located on vehicles, the winch having a frame adapted to support said drum shaft in parallel relation to the vehicle power take-off shaft, the improvements which comprise, an intermediate shaft having an axis disposed in substantially parallel relation to said drum shaft and power take-off shaft, a first transmission means operatively connecting said power take-off shaft to said intermediate shaft, a second transmission means operatively connecting said intermediate shaft to said drum shaft, a first housing enclosing said first transmission means and movable angularly about the axis of said intermediate shaft, a second housing enclosing said second transmission means and movable angularly about the axis of said drum shaft, means for rigidly securing said first housing to said second housing in selected angular positions about the axis of said intermediate shaft, and means for rigidly securing said second housing to said frame in selected angular positions about the axis of said drum shaft.

2. Winch driving mechanism in accordance with claim 1 in which said means for securing said first and second housings in selected angular positions one relative to the other about the axis of said intermediate shaft comprises an adapter plate interposed between said first and second housings and means for securing said housings in selected angular positions relative to said plate.

3. Winch driving mechanism in accordance with claim 1 wherein said first housing is formed with a bearing surface concentric with said intermediate shaft, and said means for securing said housings in selected angular positions one relative to the other comprise, an adapter plate interposed between said first and second housings and formed with a bearing surface revolubly fitting said bearing surface of said first housing, said plate having a first series of holes spaced circumferentially of a circle which is concentric with said intermediate shaft and a second series of holes spaced circumferentially of a circle which is eccentric to the axis of said shaft, means adapted to engage said plate in said holes of the first series for connecting said plate to said first housing, and means adapted to engage said plate in the holes of said second series for securing said second housing to said plate.

4. Winch driving mechanism in accordance with claim 3 wherein said second housing is formed with an opening allowing access to said means for securing said second housing to said adapter plate and provided with removable means for closing said opening.

5. Winch driving mechanism in accordance with claim 1 wherein said first housing is formed with a hub member having an external bearing surface concentric with said intermediate shaft, and said means for securing said housings in selected angular positions one relative to the other comprises, an adapter plate interposed between said first and second housings and formed with a central bearing revolubly fitting said external bearing surface of said hub member, a first series of holes spaced equally about a circle which is concentric with said intermediate shaft and a second series of holes spaced regularly and relatively closely around a circle which is eccentric to the axis of said shaft, means adapted to engage said plate in the holes of said first series for connecting said plate to said first housing and means adapted to engage said plate in the holes of said second series for securing said second housing to said plate.

References Cited in the file of this patent

UNITED STATES PATENTS 2,208,430     Ostler  ---------------- July 16, 1940